Figure 5:
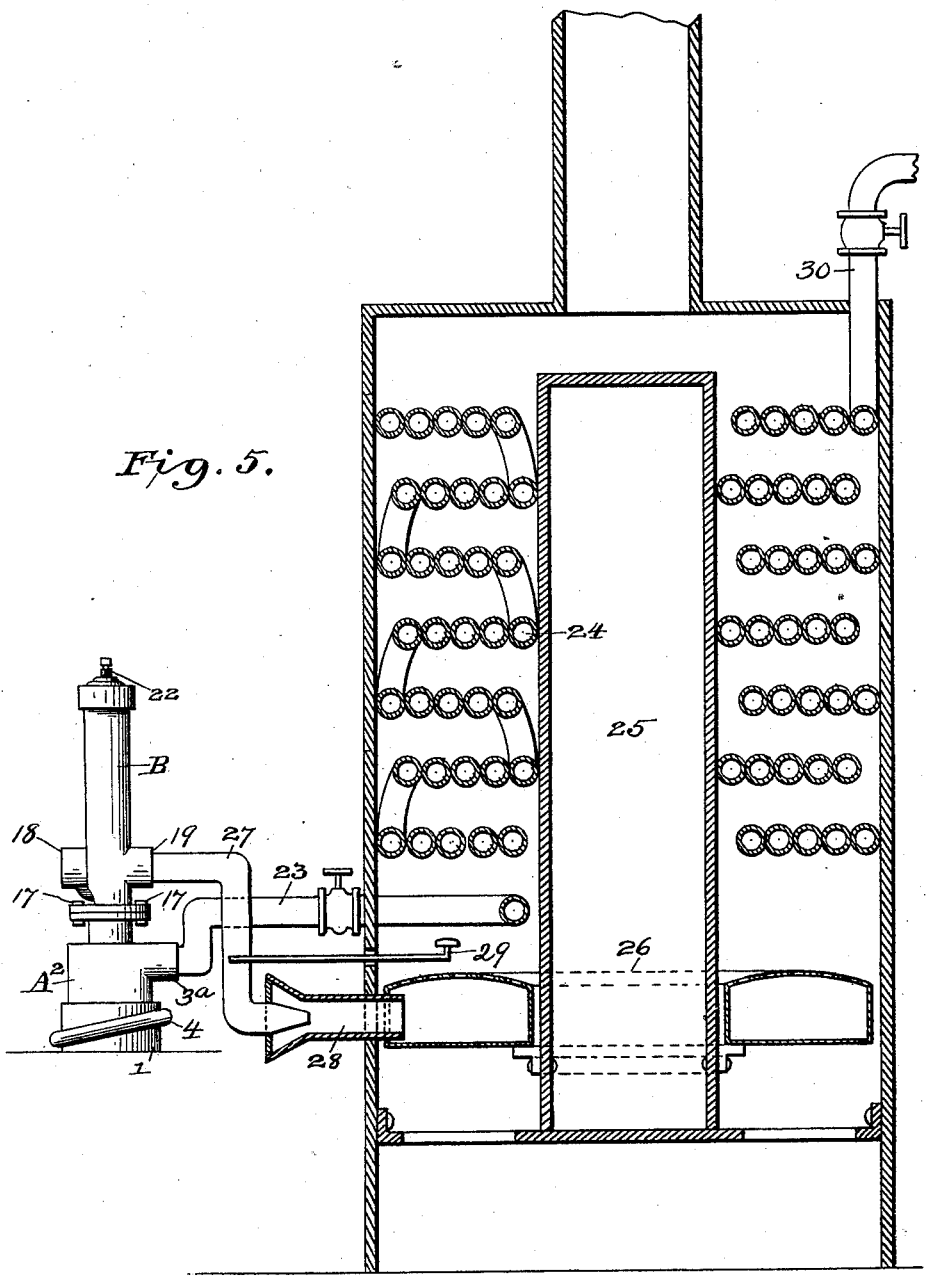

No. 609,596. Patented Aug. 23, 1898.
J. W. TAYLOR.
WATER HEATER.
(Application filed June 24, 1897.)
(No Model.) 2 Sheets—Sheet 1.
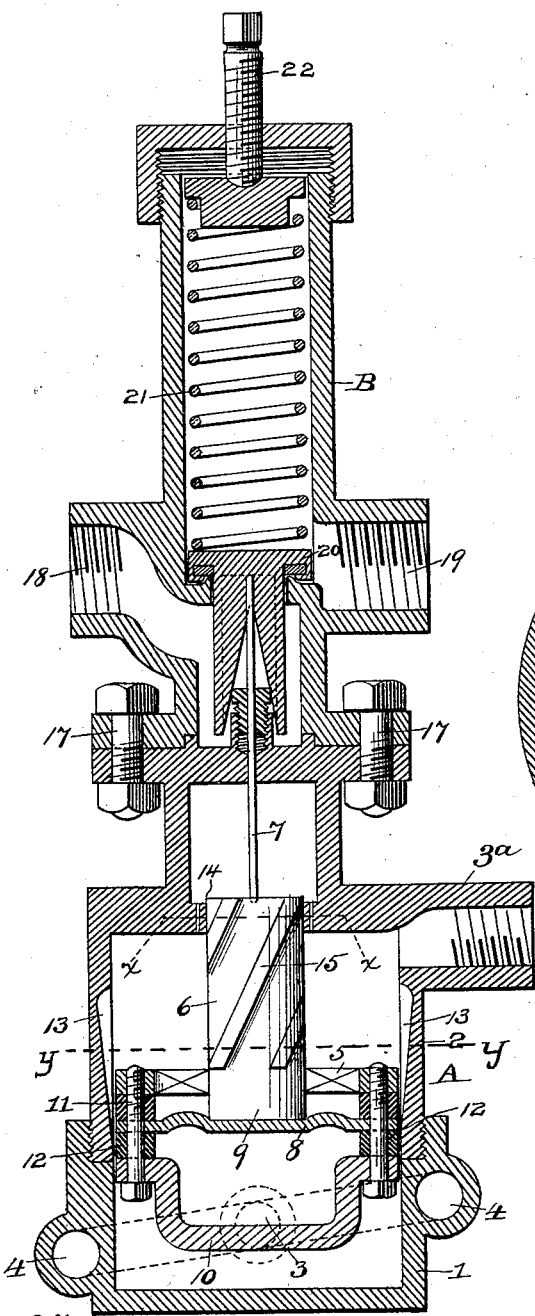
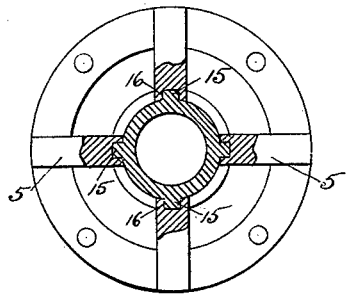
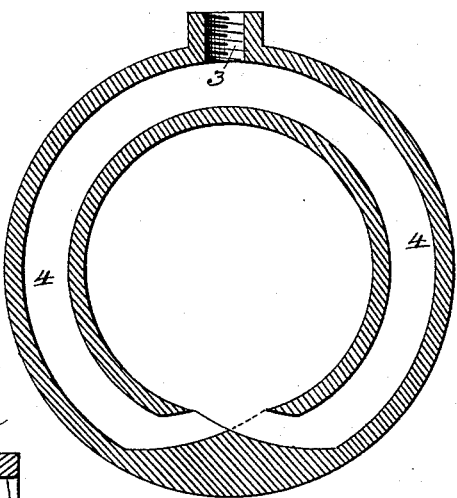
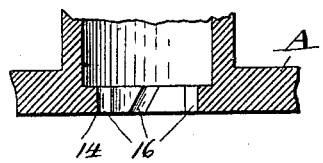
Witnesses
Jas. H. Blackwood
H. P. Doolittle
Inventor
Joseph W. Taylor
by W. H. Doolittle
Attorneys No. 609,596. Patented Aug. 23, 1898.
J. W. TAYLOR.
WATER HEATER.
(Application filed June 24, 1897.)
(No Model.) 2 Sheets—Sheet 2.

Witnesses
Jas. H. Blackwood
H. P. Doolittle.

Inventor
Joseph W. Taylor
by H. P. Doolittle & Son
Attorneys

UNITED STATES PATENT OFFICE.

JOSEPH W. TAYLOR, OF WILKINSBURG, PENNSYLVANIA, ASSIGNOR OF ONE-HALF TO HARRY W. McINTOSH, OF PITTSBURG, PENNSYLVANIA.

WATER-HEATER.

SPECIFICATION forming part of Letters Patent No. 609,596, dated August 23, 1898.

Application filed June 24, 1897. Serial No. 642,178. (No model.)

*To all whom it may concern:*

Be it known that I, JOSEPH W. TAYLOR, a citizen of the United States, residing at Wilkinsburg, in the county of Allegheny and State of Pennsylvania, have invented certain new and useful Improvements in Water-Heaters; and I do hereby declare the following to be a full, clear, and exact description of the invention, such as will enable others skilled in the art to which it appertains to make and use the same.

My invention relates to improvements in water-heaters in which the supply of heat to the water-receptacle is automatically controlled by a valve, motor, or regulator in the water-supply pipe, and more particularly to the new and improved means for preventing the collection of sediment in the valve, motor, or regulator chamber in the water-supply pipe of the heater. In water-heaters of this class it is usual to employ gas for heating the water, and a valve in the gas-pipe leading to the burner is automatically opened when the water is drawn from the water-receptacle and closed when the water ceases to be drawn. In order that this may be accomplished, it is customary to employ a valve, regulator, or motor adapted to be operated by the pressure or flow of water in the water-supply pipe leading to the heating-receptacle, the valve, regulator, or motor being connected with the gas-valve by suitable means. Regulators or motors designed to be operated by the pressure or flow of water in the water-supply pipe now generally employed are frequently prevented from doing the work required of them owing to the clogging of the mechanism due to the collection of sediment in the chamber in which the valve, regulator, or motor is situated. In a very short time a sufficient amount of sediment is accumulated to fill the space reserved for the proper working of the valve, regulator, or motor, and the proper supply of heat to the water-receptacle is thus prevented. The object of my invention is to provide simple and effective means to prevent this collection of sediment, and thereby enable the working parts within the chamber to have uninterrupted movement in the space designed for them.

In the accompanying drawings I have shown an application of my invention to a water-heater of the class hereinbefore described.

Figure 1 is a central vertical sectional view of a regulator or motor and gas-valve mechanism; Fig. 2, a horizontal section on line $xx$ of Fig. 1; Fig. 3, a cross-section on line $yy$ of Fig. 1; Fig. 4, a sectional view showing spiral grooves, and Fig. 5 a central vertical sectional view of water-heater and side elevation of regulator and gas-valve casings.

Referring to the drawings, the motor or regulator casing is represented by A and is shown connected with the gas-valve B. The regulator-casing is preferably composed of parts 1 and 2, united by suitable means, the construction shown in the drawings being a simple and convenient mode of attachment. The lower part 1 of the casing is provided with the inlet-pipe 3, which connects with the water-supply main, and the upper part 2 with the outlet-passage $3^a$. In the drawings I have shown a particular mode of introducing water to the casing, consisting of the inlet-pipe 3, which is in communication with inclined circumferential pipes 4. These pipes discharge into the regulator-chamber on different horizontal planes and give the water two opposite currents. While this mode of introducing the water into the chamber is sometimes desirable, the water may be admitted in the usual manner.

The motor or regulator mechanism shown in the drawings is provided with arms 5, extending outwardly from a cylindrical body 6, the latter having one end of a valve-stem 7 of the gas-valve 20 in contact with its upper end. Below the arms 5 is an extension 9 of the cylindrical body 6. A diaphragm 8 bears against the extension 9 and is held in place between it and a stirrer, represented in the drawings by blades or arms 10. These blades or arms 10 are securely attached to arms 5 by screw-bolts 11. Washers 12 are interposed between arms 5 and arms 10 and are placed on both sides of the diaphragm around its outer edge. The stirrer, the diaphragm, and the arms 5 of the cylindrical body 6 are united by the bolts 11 and are adapted to move together. Spiral projections 15 on the cylindrical body are for the purpose of giving to it and to the stirrer a rotary movement as they are raised and lowered through passage 14 of the casing. In the wall of the passage 14 are spiral grooves 16, in which the spiral projections 15 enter.

I do not desire to limit myself to a regulator of the particular construction above described or to be limited to the particular stirrer shown and described, for it is evident that modifications may be adopted that will come within the scope of my invention.

The regulator-casing A has a tapered passage or port 13, located in the wall of the upper part 2 of the casing, through which water flows from below the regulator to the space above it. The casing A is connected with the gas-valve casing B by means of bolts 17. The gas-valve casing is provided with an inlet-passage 18 and an outlet-passage 19, respectively adapted to be connected with a gas-supply conduit and a pipe leading to the gas-burner. A spring 21, located in a chamber in casing B above the valve 20, exerts a downward pressure upon the valve, which pressure is regulated by a screw-rod 22.

Referring now particularly to Fig. 5 of the drawings, a water-pipe 23 leads from the outlet-passage in the upper part of the motor-casing to the coil 24 in the water-heater. The coil 24 surrounds a preferably hollow standard 25, to which is attached an annular burner 26. A gas-supply pipe 27 leads from the outlet-passage 19 of the valve-casing B to the burner and is provided with an air-mixer 28. 29 is a burner for the pilot-light. A hot-water-outlet pipe 30, shown as broken off, may be led from the coil 24 to any desired point, and should be provided with faucets at the points where it is desired that the hot water be delivered.

When it is desired to draw hot water from the heater, a faucet in one of the service-pipes is opened and water is drawn from the coil, which lessens the pressure above the motor or regulator. The pressure of the water below the regulator then raises the regulator together with the stirrer and allows water to flow up through port 13 and out of the chamber to the heating-coils, and as the regulator is raised the gas-valve 20 is also raised and the supply of gas to the burner increased. When the flow of water from the heating-coil is stopped, the pressure of the water above the regulator overcomes the pressure of the water below it and the regulator is lowered, causing the gas-valve to close and stop the supply of gas to the burner. I have shown means whereby the regulator as it is raised and lowered is given a rotary movement, and as the stirrer or agitator is attached to the regulator it is given a similar simultaneous rotary movement.

By my invention I provide means that will prevent the collection of sediment within the heat-regulator chamber, thereby doing away with a highly objectionable feature heretofore found in the regulator-chambers of water-heaters of the class in which the supply of heat to the water-receptacle is automatically controlled by a regulator in the water-supply pipe.

What I claim, and desire to secure by Letters Patent, is—

1. In a water-heater, in combination with a water-receptacle, a source of heat-supply, a source of water-supply and a water-outlet, a regulator to control the flow of heat and water, a chamber for said regulator and automatic means controlled by the flow of water to prevent the collection of sediment within said chamber, substantially as described.

2. The combination with a water-receptacle provided with a supply-pipe and an outlet-pipe, a gas-burner adapted to heat the water-receptacle, a supply-pipe for the burner, a valve in the gas-supply pipe, a chamber in the water-supply pipe, a regulator in said chamber to operate the gas-valve adapted to be raised by the flow of water through the chamber and lowered when the flow of water is stopped, said regulator provided with means adapted to prevent the collection of sediment within the chamber.

3. The combination with a water-receptacle provided with a supply-pipe and an outlet-pipe, a gas-burner adapted to heat the water-receptacle, a supply-pipe for the burner, a valve in the gas-supply pipe, a chamber in the water-supply pipe, a regulator in said chamber to operate the gas-valve adapted to be raised with a rotary movement by the flow of water through the chamber and lowered with a rotary movement when the flow of water is stopped, said regulator provided with means adapted to prevent the collection of sediment within the chamber.

4. The combination with a water-receptacle provided with a supply-pipe and an outlet-pipe, a gas-burner adapted to heat the water-receptacle, a supply-pipe for the burner, a valve in the gas-supply pipe, a chamber in the water-supply pipe, a regulator in said chamber adapted to operate the gas-valve and be raised by the flow of water through the chamber and lowered by the pressure above the regulator when the flow of water is stopped, a stirrer in said chamber attached to the regulator, and means for giving the regulator and stirrer a rotary movement as they are raised and lowered.

5. In a water-heater, the combination with the water-receptacle, a source of heat-supply, an outlet from the water-receptacle, a water-supply pipe, a casing in the supply-pipe, a regulator in the casing adapted to control the supply of heat to the water-receptacle and be actuated by the flow of water through the casing and by the pressure above the regulator when the flow of water is stopped, a stirrer within the casing attached to the regulator and adapted to move with it.

6. In a water-heater, the combination with the water-receptacle, a source of heat-supply, an outlet from the water-receptacle, a water-supply pipe, a casing in the supply-pipe, a regulator in the casing adapted to control the supply of heat to the water-receptacle, a stirrer attached to the regulator, said regulator and stirrer adapted to be raised with a rotary movement by the flow of water through the casing and lowered with a rotary movement by the pressure above the regulator, when the flow of water is stopped.

7. In a water-heater, the combination with the water-receptacle, a source of heat-supply, an outlet from the water-receptacle, a water-supply pipe, a casing in the supply-pipe, a chamber in the casing, means for discharging water into the chamber from different horizontal planes and imparting two opposite currents to the water within the chamber, a regulator within the chamber adapted to control the supply of heat to the water-receptacle and be actuated by the flow of water through the chamber and by the pressure above the regulator when the flow of water is stopped, a stirrer within the chamber attached to the regulator and adapted to move with it.

In testimony whereof I affix my signature in presence of two witnesses.

JOSEPH W. TAYLOR.

Witnesses:
  W. G. DOOLITTLE,
  A. P. DAVIS.